(12) United States Patent
Collins

(10) Patent No.: US 6,588,996 B1
(45) Date of Patent: *Jul. 8, 2003

(54) PRECISION GUIDANCE SYSTEM FOR POSITIONING MOTOR VEHICLES

(76) Inventor: Joe H. Collins, 87749 Collins La., Springfield, OR (US) 97478

( * ) Notice: Subject to any disclaimer, the term of this patent is extended or adjusted under 35 U.S.C. 154(b) by 0 days.

This patent is subject to a terminal disclaimer.

(21) Appl. No.: 09/692,905

(22) Filed: Oct. 19, 2000

Related U.S. Application Data

(63) Continuation-in-part of application No. 09/148,761, filed on Sep. 4, 1998.

(51) Int. Cl.⁷ .............. B60P 3/06; B61D 3/18
(52) U.S. Cl. .............. 410/9; 410/22; 410/67
(58) Field of Search .............. 410/7, 9, 19, 22, 410/48, 67, 77; 414/483, 485, 482, 484; 280/402

(56) References Cited

U.S. PATENT DOCUMENTS

| | | |
|---|---|---|
| 1,794,321 A | 2/1931 | Rebuck |
| 1,824,634 A | 9/1931 | Snyder |
| 1,923,382 A | 8/1933 | Leet |
| 2,313,335 A | 3/1943 | Godfrey |
| 2,860,800 A | 11/1958 | Wilson et al. |
| 3,035,728 A | 5/1962 | Hecker |
| 4,479,746 A | 10/1984 | Huber |
| 4,968,210 A | 11/1990 | Friederich |
| 5,730,061 A * | 3/1998 | Stufflebeam |
| 5,795,115 A | 8/1998 | Collins |

FOREIGN PATENT DOCUMENTS

FR 2 236 687 2/1975

* cited by examiner

Primary Examiner—D. Glenn Dayoan
Assistant Examiner—Scott Carpenter
(74) Attorney, Agent, or Firm—Robert E. Howard

(57) ABSTRACT

A precision guidance system for positioning motor vehicles on a motor vehicle support surface, such as a carrier for transportation. The guidance system includes primary guide members extending from the support surface, preferably located to engage the inner surfaces of the motor vehicle tires. The guidance system allows precisely positioning the motor vehicle on the support surface for purposes of engaging mating devices extending from the motor vehicle and the motor vehicle support surface, such mating devices including vehicle restraint means, electrical connections, and pneumatic or hydraulic connections.

23 Claims, 7 Drawing Sheets

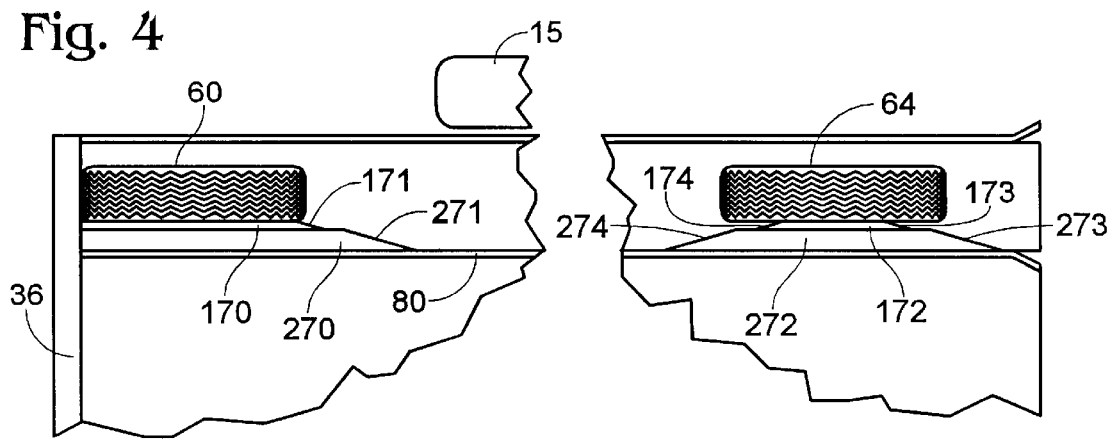
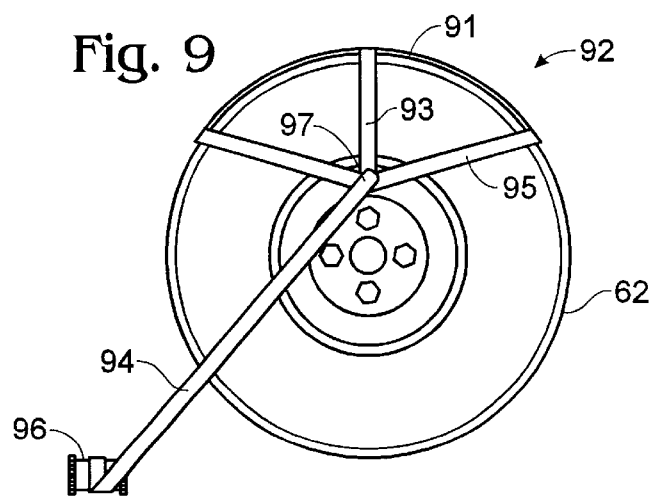
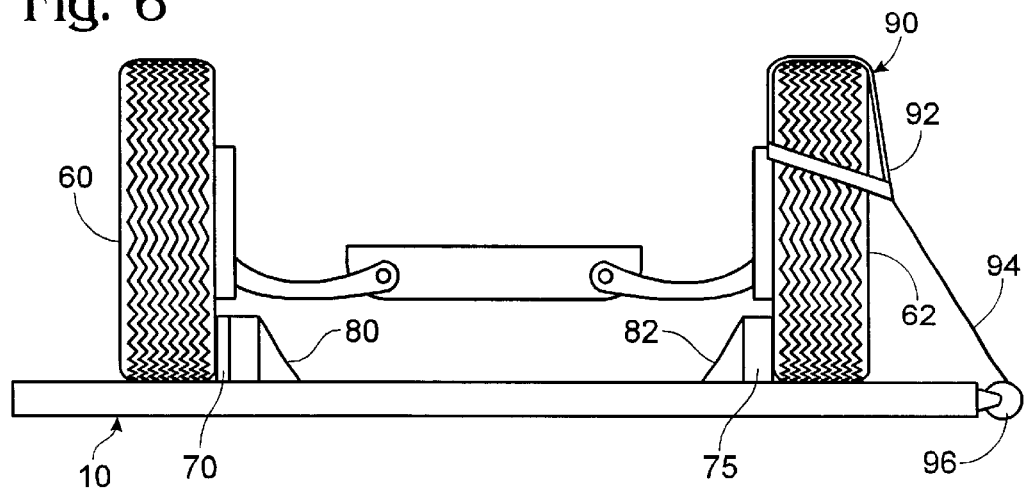

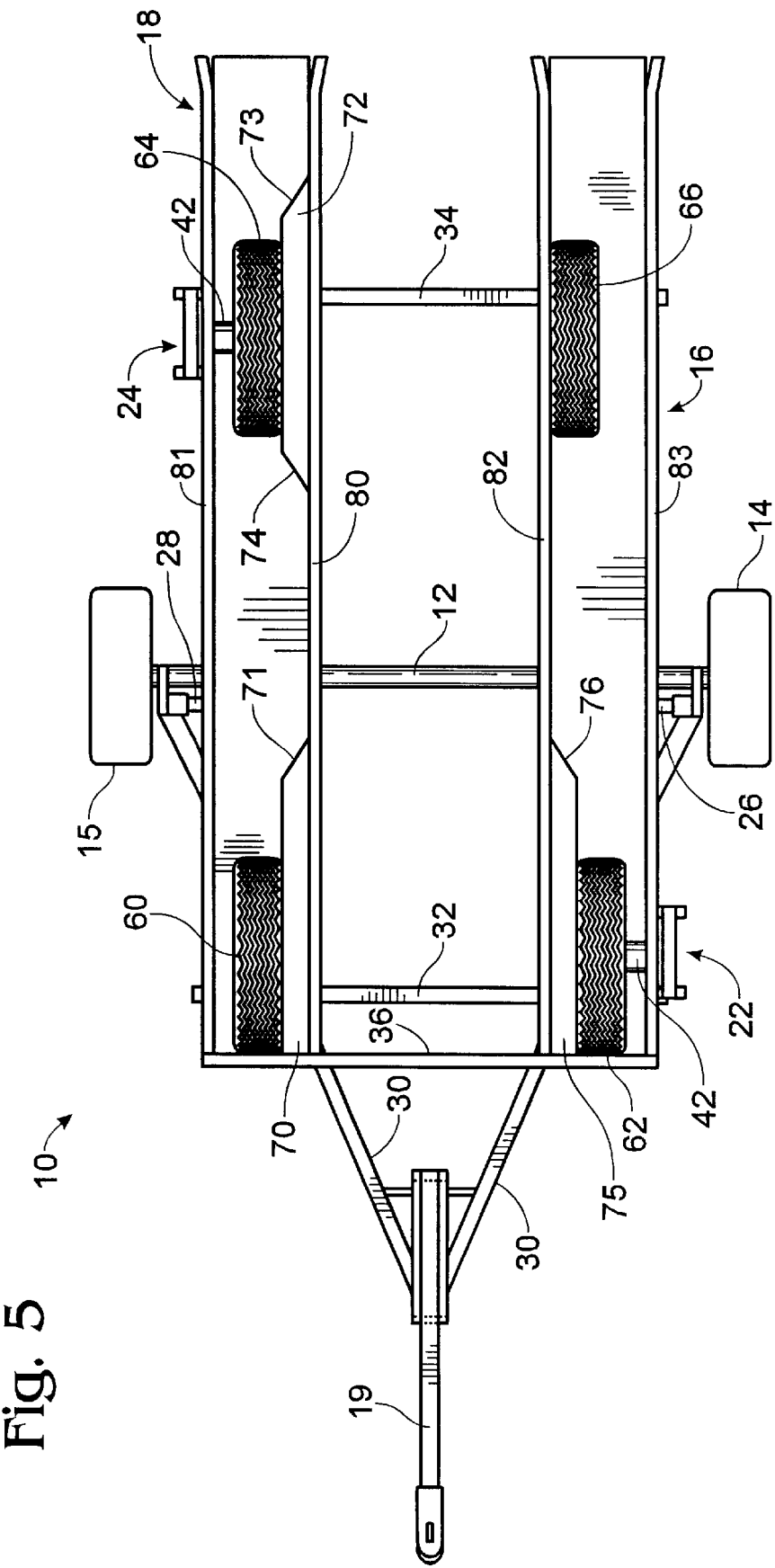

PRECISION GUIDANCE SYSTEM FOR POSITIONING MOTOR VEHICLES

CROSS-REFERENCE TO RELATED APPLICATIONS

This is a continuation-in-part of application Ser. No. 09/148,761 filed Sep. 4, 1998.

FIELD OF THE INVENTION

This invention relates to a precision guidance and lateral retention system for positioning and laterally supporting motor vehicles on a supporting surface, such as a motor vehicle carrier, to engage mating devices extending from the vehicle and supporting surface. The mating devices include vehicle restraint systems, and electric, hydraulic, or pneumatic contact assemblies.

BACKGROUND OF THE INVENTION

Motor vehicles, such as automobiles, are frequently transported on carriers, such as trailers, trucks, railcars, boats, aircraft, etc. For example, many automobiles are towed behind recreational vehicles for use after the recreational vehicle is parked. Automobiles are also transported for purposes of repair or parking violations.

Currently such trailers do not require aligning the automobile on the trailer with any precision since the automobile is merely secured to the trailer bed by tether means.

A recent trailer configuration developed by the present inventor secures the automobile to the trailer by using vehicle restraining means comprised of male flange members or female latch assemblies attached to and extending from one or more of the motor vehicle wheel assemblies which mate and lock with corresponding female latch assemblies or male flange members attached to the trailer bed. This trailer configuration is described in U.S. Pat. No. 5,795,115. Such vehicle restraining means has been found to require very close, repeatable and predictable tolerances between the location of the male flange member and the female latch assembly in order that they can properly engage.

The use of electric vehicles and mobile equipment is growing. Close, repeatable and predictable positioning of the electric power inlet on such vehicles relative to a power outlet source would be highly desirable.

SUMMARY OF THE INVENTION

It is an object of the present invention to provide a precision guidance system for positioning motor vehicles on a supporting surface, such as a carrier, for the purpose of aligning latching mechanisms, for aligning accessory connections, or to prevent lateral movement of the motor vehicle for other purposes.

It is a further object to provide a precision guidance system for positioning electric powered vehicles and mobile equipment for connection to an electric power source.

It is a further object to provide a tie down assembly for securing motor vehicles to carriers.

It is a still further object to provide an electric, hydraulic, or pneumatic accessory connection between a motor vehicle and its carrier.

The present invention provides a precision guidance system for positioning a motor vehicle on a supporting surface for the purpose of securing the vehicle against movement with vehicle restraint means, or for the purpose of connecting the vehicle to an electric power source, hydraulic fluid source, or compressed air source.

The guidance system of the present invention includes primary vehicle tire guides located closely adjacent at least some of the motor vehicle tires to thereby provide intimate contact with the inboard or outboard side of the adjacent a motor vehicle tire. The primary vehicle tire guides may be attached directly to the support surface, such as the bed of a motor vehicle carrier, or to secondary tire guides extending longitudinally adjacent the sides of the motor vehicle tires.

Where the guidance system is being used on a carrier with a wheel latching mechanism and the rear axle of the motor vehicle is shorter than the front axle so that the rear wheels are closer together than the front wheels, the primary vehicle tire guides located adjacent the rear wheels are configured to move at least the tire adjacent the latching mechanism attached to the carrier a lateral distance sufficient to cause the latching mechanism on the carrier to be in position to engage with the cooperating wheel latch mechanism located on the vehicle tire.

The invention also provides an alternative vehicle restraint system for use with a motor vehicle that has been fully positioned on a carrier by the guidance system of the invention. The vehicle restraint system is a tie down assembly comprised of a harness, a strap and a strap tensioning means such as a ratchet.

The invention further proves for an electric, hydraulic, or pneumatic contact assembly which makes use of the precision positioning of a vehicle by the guidance system of the invention. The electric, hydraulic, or pneumatic contact assembly includes a male or female electric, hydraulic, or pneumatic connection means attached to the vehicle and a female or male electric, hydraulic, or pneumatic connection member located on the vehicle support surface, both being located and adapted to engage and complete an electric circuit, or hydraulic or pneumatic connection when the vehicle is fully positioned by the guidance system.

BRIEF DESCRIPTION OF THE DRAWINGS

FIG. 4 is a partial top schematic view showing an alternative construction for the primary tire guides;

FIG. 5 is a top, plan view of the trailer of the invention configured for use with a motor vehicle having a shorter rear axle;

FIG. 6 is a partial front view of a motor vehicle secured to a trailer by the tie down assembly of the invention;

FIG. 9 is a front view of the tie down assembly of the invention;

DESCRIPTION OF PREFERRED EMBODIMENTS OF THE INVENTION

Figure 1:
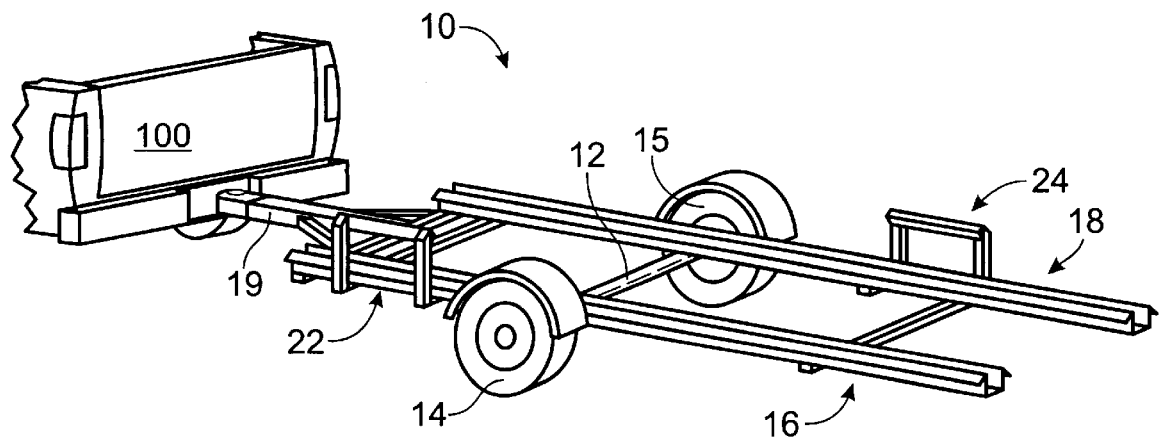
FIG. 1 is a partial perspective view of a trailer of a type useful in association with the motor vehicle guidance system of the invention.

FIG. 1 generally illustrates a typical vehicle trailer 10 used for transporting motor vehicles. Although the invention will be described primarily relative to a trailer, the invention is applicable to other types of motor vehicle carriers such as trucks, railcars, boats, aircraft, etc., and is applicable in guiding a wheeled vehicle on the ground to an electric power source, or hydraulic or pneumatic connection.

Trailer 10 is illustrated as having a single axle 12, left and right wheels 14 and 15, a pair of left and right channel-shaped tracks or ramps 16 and 18, and a tow bar 19 of conventional construction for attaching the trailer 10 to a tow vehicle, such as partially illustrated pickup truck 100. The tires of a motor vehicle to be towed are supported on channel-shaped tracks or ramps 16 and 18. The motor vehicle is releaseably secured to trailer 10 by left front and right rear latch assemblies 22 and 24.

Latch assemblies 22 and 24 will not be described in detail since they are described in aforementioned U.S. Pat. No. 5,795,115, the entire contents of which is incorporated herein by reference.

Figure 2:
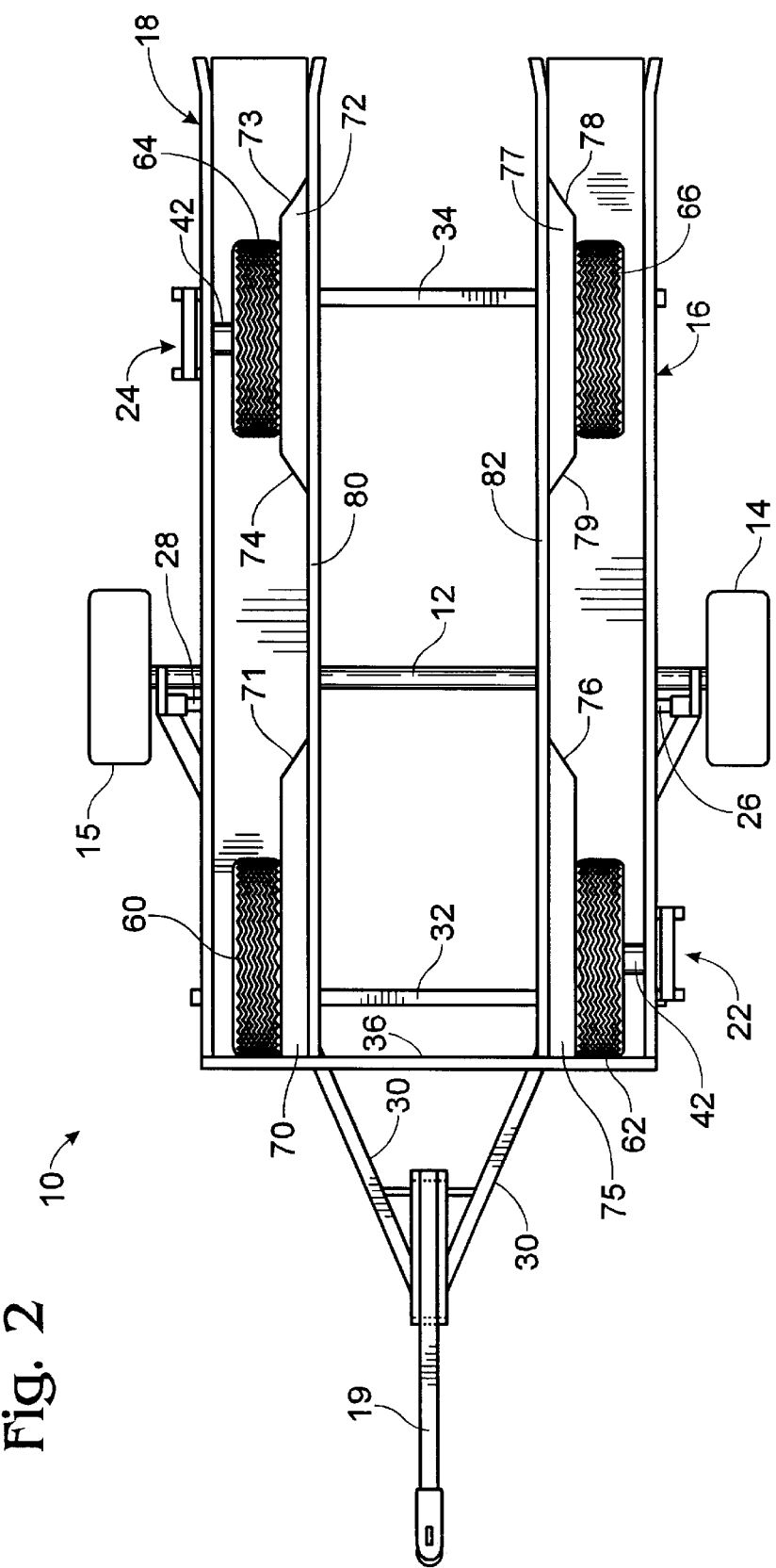
FIG. 2 is a top, plan view of the trailer of the invention.

The construction of trailer 10 is best seen in FIG. 2. Trailer 10 includes vehicle axle 12, left and right support structures 26 and 28 located at the outboard ends of the axle 12, and a V-shaped frame member 30 having the tow bar 19 permanently affixed thereto.

Left and right C-shaped tracks 16 and 18 are mounted on front cross support 32 and rear cross support 34. C-shaped tracks 16 and 18 are pivotally mounted on axle 12 so as to permit the trailer 10 to be disposed in a substantially horizontal position for hauling or tilted so that the rear ends of tracks 16 and 18 touch the ground for loading and unloading the motor vehicle.

A tire stop 36 is located at the front of trailer 10 and prevents the forward movement of a towed vehicle beyond its location. Tire stop 36 may intersect the tire receiving channels of C-shaped tracks 16 and 18 to engage the front tires of the vehicle to prevent such forward movement, or tire stop 36 may have a height such that it engages the bumper of the vehicle.

Although for ease of illustrating the invention the trailer is illustrated as having a single axle 12 with left and right wheels 14 and 15 located at the ends thereof, a trailer having dual, tandem wheels located on each side of the trailer may also be used.

Figure 3:
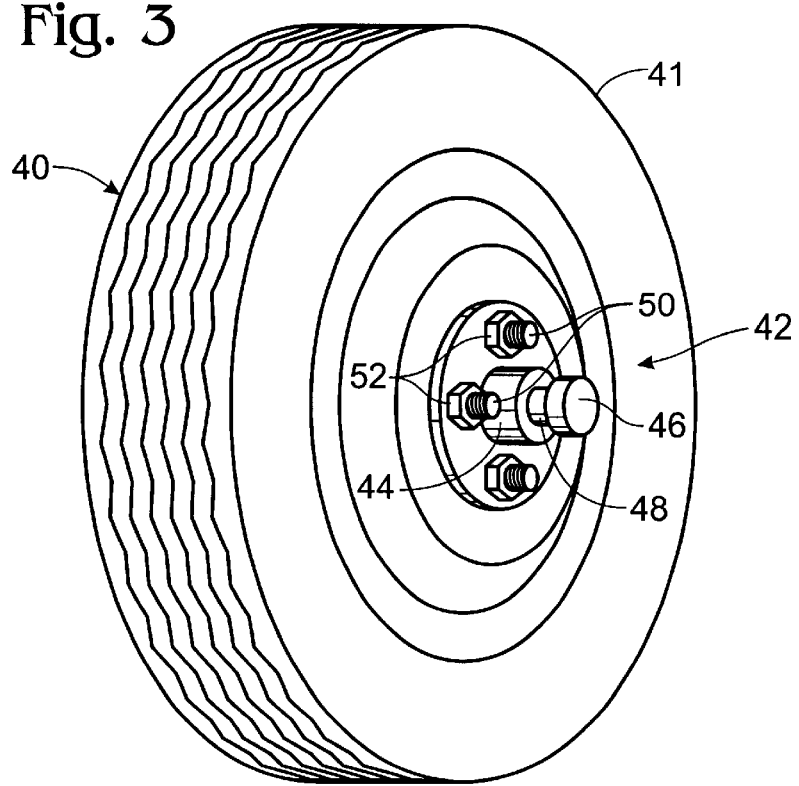
FIG. 3 is a perspective view of a motor vehicle tire showing a male latching flange extending therefrom.

FIG. 3 illustrates a wheel 40 of a vehicle to be towed. The wheel 40 includes a tire 41 and a male wheel latch flange generally indicated at 42. The wheel latch flange 42 is comprised of a stub shaft 44 having an integrally attached flat, disc-shaped head 46 and a groove 48 of diminished diameter. Latching flange 42 has a plurality of openings in its base through which pass wheel lugs 50. Latching flange 42 is secured to the wheel 40 by lug nuts 52.

As can be envisioned, the insertion of male wheel latch flange members 42 protruding from at least one front and at least one rear wheel of the vehicle into latching engagement with the latch assemblies 22 and 24 attached to the trailer requires that the motor vehicle wheels be accurately positioned during loading onto trailer 10 in order for such male members to properly engage the latch assemblies.

It has been found, for example, that for proper engagement of such male flange members 42 and latch assemblies 22 and 24, positioning tolerances as close as 0.065 inch or less are desirable and can be obtained with the guidance system of the present invention.

For purposes of explaining the invention, latching mechanism 22 is illustrated as being located on the left front of trailer 10 and latching mechanism 24 is illustrated as being located on the right rear of trailer 10. However, it is clear that the latching mechanisms could be located elsewhere, such as at the right front and left rear, at both front locations and one rear location, etc., all as described in U.S. Pat. No. 5,795,115. In such event, male latching flange 42 would be located on those wheels adjacent the location of the latching mechanisms.

Referring again to FIG. 2, right front and right left wheels 60 and 62, and right rear and left rear wheels 64 and 66 of a towed motor vehicle are shown in place on trailer 10. Left front wheel 62 and right rear wheel 64 have male latching flange members 42 extending therefrom and into locking engagement with latch assemblies 22 and 24. As mentioned, latch assemblies 22 and 24 and male latching flange member 42, and a detailed description of their construction and how they engage into locking relationship is contained in the disclosure of U.S. Pat. No. 5,795,115.

In order to guide the wheels 60, 62, 64 and 66, and particularly wheels 62 and 64 having male latching flange members 42 extending therefrom, accurately into the position required for latching flange members 42 to lockingly engage latch assemblies 22 and 24, right hand side primary guide members 70 and 72 are attached to right hand side secondary guide member 80 on its outboard side, and left hand side primary guide members 75 and 77 are attached to left hand side secondary guide member 82 on its outboard side. The primary guides may be attached to the secondary guides by any conventional fastening means, such as by welding or using nuts and bolts. In any event, the attaching means must be flush with the outer face of the primary guides to avoid abrading against the inside of adjacently located tires.

Although it is preferred to attach the primary guides to secondary guides, as illustrated, it is to be understood that the secondary guides could be eliminated and the primary guides attached directly to the deck of the carrier. Right side primary guides 70 and 72 and left side primary guides 75 and 77 are illustrated as preferably being separated; however, they could be joined together to form a single right hand primary guide and a single left hand primary guide.

Forwardly located primary guide members 70 and 75 are flared or sloped at an obtuse angle toward respective secondary guide members 80 and 82 on their rearward ends 71 and 76, and rearwardly located primary guide members 72 and 77 are likewise flared or sloped at an obtuse angle toward secondary guide members 80 and 82 on their rearward ends 73 and 78, respectively.

Rearwardly located primary guide members 72 and 77 are additionally flared or sloped at an obtuse angle toward secondary guide members 80 and 82 at their forward or front ends 74 and 79.

The purpose of having flared or sloping ends 71, 73, 76, and 78 is to automatically move and align the inner sides of the tires of a motor vehicle being loaded onto the trailer into intimate contact with the outboard faces of the primary guide members 70, 72, 75 and 77, respectively.

The purpose of having flared or sloping forward ends 74 and 79 on rearwardly positioned primary guide members 72 and 77 is to prevent front tires 60 and 62 from coming into blocking engagement with the forward ends of primary guide members 72 and 77 when the motor vehicle is being unloaded from trailer 10. That is to say, when a motor vehicle is being unloaded from trailer 10, ends 74 and 79 of rearwardly positioned primary guide members 72 and 77 could block rearward movement thereof if the forward ends of primary guide members 72 and 77 were perpendicular, or at an acute angle, to secondary guide members 80 and 82.

Primary guides 70, 72, 75, and 77 may be made of any material which can withstand repeated engagement with tires of motor vehicles being loaded and unloaded from trailer 10, such as steel. It has been found to be desirable to use a material which is strong yet has a low coefficient of friction, such as ultra high molecular weight polyethylene.

Primary guides 70, 72, 75, and 77 have each been illustrated in FIG. 2 as being constructed of a single piece. It is clear, however, that the primary guides may be constructed of two or more pieces. A particularly useful construction is illustrated in FIG. 4 in which parts in common with FIG. 2 have the same reference numerals.

FIG. 4 shows a forwardly positioned right side primary guide 170 having a flared or sloping rearward end 171. Located between primary guide 170 and secondary guide 80 is a guide shim 270 having a flared or sloping rearward end 271.

Also shown in FIG. 4 is a rearwardly positioned right side primary guide 172 having a flared or sloping rearward end 173 and a flared or sloping forward end 174. Located between primary guide 172 and secondary guide 80 is a guide shim 272 having a flared or sloping rearward end 273 and a flared or sloping forward end 274.

The advantage of the construction of FIG. 4 is that it permits the trailer manufacturer or lessor to easily adjust the outboard reach of the face of primary guides 170 and 172 by the thickness of the guide shims 270 and/or 272 selected. Thus, motor vehicles having different axle sizes can be easily accommodated. Again, although the primary guides 170 and 172 may be made of any strong material, it is preferred to use a low coefficient of friction material such as ultra high molecular weight polyethylene. Although not shown, primary guides identical to, but mirror images of, primary guides 171 and 172 and their associated guide shims 270 and 272 would be located on the left side of trailer 10.

It has been found that the amount of interference between the primary guide and tire sidewall greatly affects repeatable indexing of the position of the motor vehicle. The phrase "interference" refers to the distance the outer surfaces of the primary guides extends outwardly into the space where the motor vehicle tires would be located if not pushed outwardly by the primary guides. For example, using a sub compact automobile with zero interference between primary guides and tire sidewalls, i.e., with the distance between the outer faces of laterally adjacent primary guides being adjusted to be the same distance as that between the insides of laterally adjacent tires before loading onto the trailer ("pre-loaded"), and with the tire stop 36 at a fixed location, lateral variances in the distance between a selected tire and a fixed point on the trailer of 0.1425 inch were repeatedly obtained through ten loadings of the motor vehicle onto the trailer. The same vehicle, with a pre-loaded 0.125 inch interference between the insides of the tire sidewalls and adjacent primary guides, provided a lateral variance of only 0.065 inch. Although a larger sidewall to primary guide interference would result in even a lesser variance, it has been determined that a 0.065 inch interference tolerance is acceptable for the guidance system of this invention. That is to say, the outer planar face of a primary guide preferably extends through the vertical plane of the adjacent tire surface, preferably by a distance of at least 0.125 inch, but not so great as to prevent full loading of the motor vehicle onto the carrier.

The invention has been described relative to a trailer for towing a motor vehicle where the front and rear tires are spaced apart substantially the same distance. Where the motor vehicle to be towed has a rear axle shorter than the front axle, the rear tire having the male latch flange 32 attached thereto would not ordinarily come into proper engagement with the associated rear latch assembly where the latch assembly has been positioned to accommodate a vehicle having front and rear axles that are substantially the same length. Moving latching assembly 24 inwardly would not work since right front wheel 60 has to be able to clear latching assembly 24 during loading.

Such a configuration can be accommodated by removing the primary guide, or reducing the guide shim thickness, from the side of the trailer opposite the side carrying the rear latch assembly. This configuration causes the rear wheels of the towed vehicle to be shifted toward the side of the trailer carrying the latch assembly, and, thus, bring the male latch flange 42 attached to the wheel engaging the primary guide into locking engagement with the latch assembly attached to the trailer. Such a configuration is illustrated in FIG. 5 where left rear primary guide member 77 (shown in FIG. 2) has been removed, and rear wheels 64 and 66 have, therefore, been shifted to the right side of the trailer 10 by primary guide 172 and associated guide shim 272, as shown.

It is preferred to place the primary guides on the inside of the motor vehicle tires, as described above, in order to avoid visible scuffing of the tires. However, the primary guides may be placed on the outside of the tires as long as sufficient interference between the outer face of the primary guides and the outer tire surface occurs to provide repeatable indexing of the vehicle on the trailer. In such a case, and with the trailer configuration shown in the drawings, the outboard walls 81 and 83 of C-shaped tracks 16 and 18 would become the secondary guide members.

It may also be desirable to place primary guides on both the inboard and outboard secondary guide rails, either in different locations or adjacent each other. For example, in the configuration illustrated in FIG. 5, it may be desirable to locate an additional primary guide on the outboard secondary guide rail 81 opposite primary guide 72 to thereby prevent contact between the body of a motor vehicle being loaded onto trailer 10 and latching mechanism 24.

The secondary guide members 80 and 82 have been illustrated as being the inboard wall of C-shaped tracks 16 and 18 of a trailer. However, other types of trailers, such as a flat bed type trailer, or other types of carriers having a flat deck, such as a railcar, boat, aircraft, etc., may be used in practicing the invention, in which such case the secondary guides would be longitudinally extending rails attached to the carrier bed in a location to provide the primary guide/tire interaction described herein relative to trailer 10, or the secondary guides entirely omitted and the primary guides attached to the carrier bed.

Figure 10:
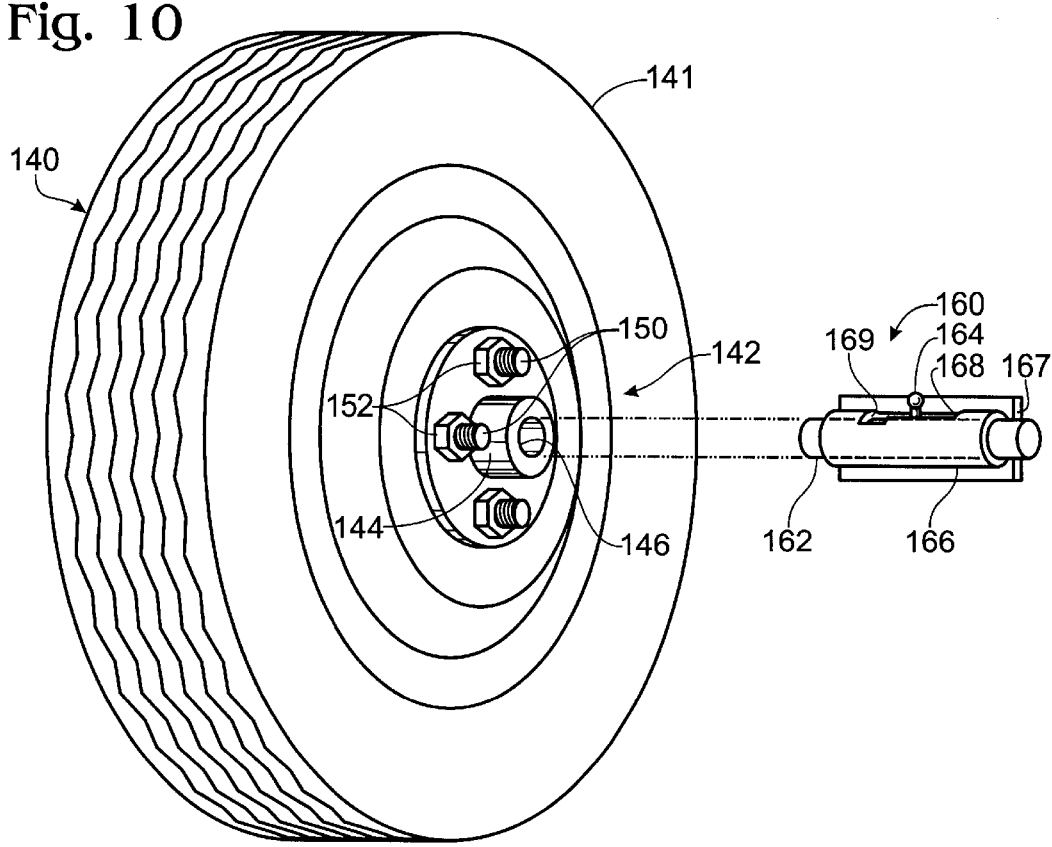
FIG. 10 is an exploded, perspective view of an alternative embodiment of the latching mechanism.

The latch assembly vehicle restraint mechanism described in U.S. Pat. No. 5,795,115 is not limited to having the male latching mechanism attached to the motor vehicle and the female latching mechanism attached to the trailer. The reverse arrangement would also work, i.e., the male latching mechanism could be attached to the trailer and the female latching mechanism attached to the motor vehicle. Such an arrangement is shown in FIG. 10 wherein wheel 140 includes a tire 141 and a female latch flange generally indicated at 142. The female latch flange 142 is comprised of a hollow cylindrical shaft 144 extending therefrom, shaft 144 having a central bore 146 located along the longitudinal axis thereof. A plurality of wheel lugs 150 pass through openings in latch flange 142, flange 142 being secured to wheel 140 by lug nuts 152. Male latching member 160 is comprised of a sliding bolt 162 having a bolt handle 164, bolt 162 being slidably contained in bolt sleeve 166. Bolt sleeve 166 is attached to bolt plate 167 which, in turn, is attached to a vertical support post (not shown) extending up from the floor or longitudinal edge of the trailer. Bolt handle 164 extends up through a longitudinal slot 168 in bolt sleeve 166, the slot terminating at a locking notch 169. Wheel 140 is positioned by the guidance system of the present invention so that bore 146 is aligned with bolt 162, the distance between bore 146 and bolt 162 being close enough that when bolt 162 is extended toward wheel 140 it engages and extends into bore 146, bolt 162 being locked into place by rotating handle 164 into notch 169.

Although the invention has been described relative to a motor vehicle restraint system utilizing the trailer latch assembly described in U.S. Pat. No. 5,795,115, it has been found that other vehicle restraint systems may be used with the guidance system of the invention since the tires of the motor vehicle are held firmly in place against lateral movement by adjacent primary guides pressing against them.

One such restraint device is schematically illustrated in FIGS. 6 and 9. FIG 6 shows a view of the front of a motor vehicle, having wheels 60 and 62 and a frame member 101 positioned, on a trailer 10 having primary guide members 70 and 75 in intimate contact with the inside surfaces of right and left front tires 60 and 62 of the motor vehicle. means of a harness portion 92 which is draped over the top of tire 62, tensioning strap means (tether) 94 attached at one end to harness portion 92 and at the other (free) end to a tension means 96, such as a ratchet, located on the left longitudinal side of trailer 10 substantially adjacent left front tire 62.

FIG. 9 shows a front view of tie down assembly 90 in more detail. Harness portion 92 is comprised of a radial strap 91 placed over the top of tire 62. Radial strap 91 has a vertical strap 93 which extends down vertically on both sides of tire 62, only the front portion being shown in FIG. 9. A generally horizontal strap member 95 extends around the front (outer) side and back (inner) side of tire 62, only the front portion being shown in FIG. 9. Strap member 95 is attached to the ends and midportion of radial strap 91 and attached to the outer ends of vertical strap 93 at juncture point 97. The free end of tether 94 is attached to a tether tightening mechanism 96, such as a ratchet. Tensioning strap 94 extends slightly forward of a line perpendicular to the trailer deck that passes through the center of wheel 62, the angle being exaggerated in FIG. 9 for purpose of illustration. This is because tie down assembly 90 is only required to prevent backward movement of the motor vehicle since stop member 36 prevents forward movement and primary guides 70 and 75 prevent lateral movement. During operation of trailer 10 there is very little acceleration causing backward movement which allows tie down assembly 90 to be secured by tether tensioning means 96 located at the side of the trailer substantially adjacent the tire that is tied down instead of at the front of the trailer, thus providing easier access to the tether tensioning means.

In order to comply with state laws requiring open transported loads to be secured at each end of the load, two tie down assemblies 90 are located on front and rear tires that are diagonally opposite. For example, in FIG. 6 tie down assembly 90 is shown attached to the front left tire 62. An identical tie down assembly (not shown) would be attached to the right rear tire 64 of the vehicle and trailer. The primary guides 70 and 75, being in intimate contact with tires 60 and 62, precludes side shifting and loosening of the tie down assemblies during transportation. Where two tie down assemblies 90 are employed, it is not necessary to have stop member 36. The tether 94 of the tie down assembly 90 attached to the right rear tire 64 would be attached to a tether tensioning means 96 located on the right longitudinal edge of trailer 10 slightly to the rear of tire 64.

The invention has been described as a motor vehicle guidance system for trailers for the purpose of aligning the tires of the motor vehicle with vehicle restraint devices. There are other reasons for desiring to accurately align a motor vehicle on a support surface. One such purpose would be to complete a hydraulic or pneumatic connection. Another such purpose would be to complete an electrical connection between the motor vehicle, trailer and other electrically operated devices for various purposes, such as actuating trailer raising and lowering motors by means of a switch located within the motor vehicle.

There are also reasons for accurately aligning a vehicle on the ground, such as for the purpose of aligning an electric vehicle with a power source for recharging batteries or to recharge an air or hydraulic accumulator.

Figure 7:
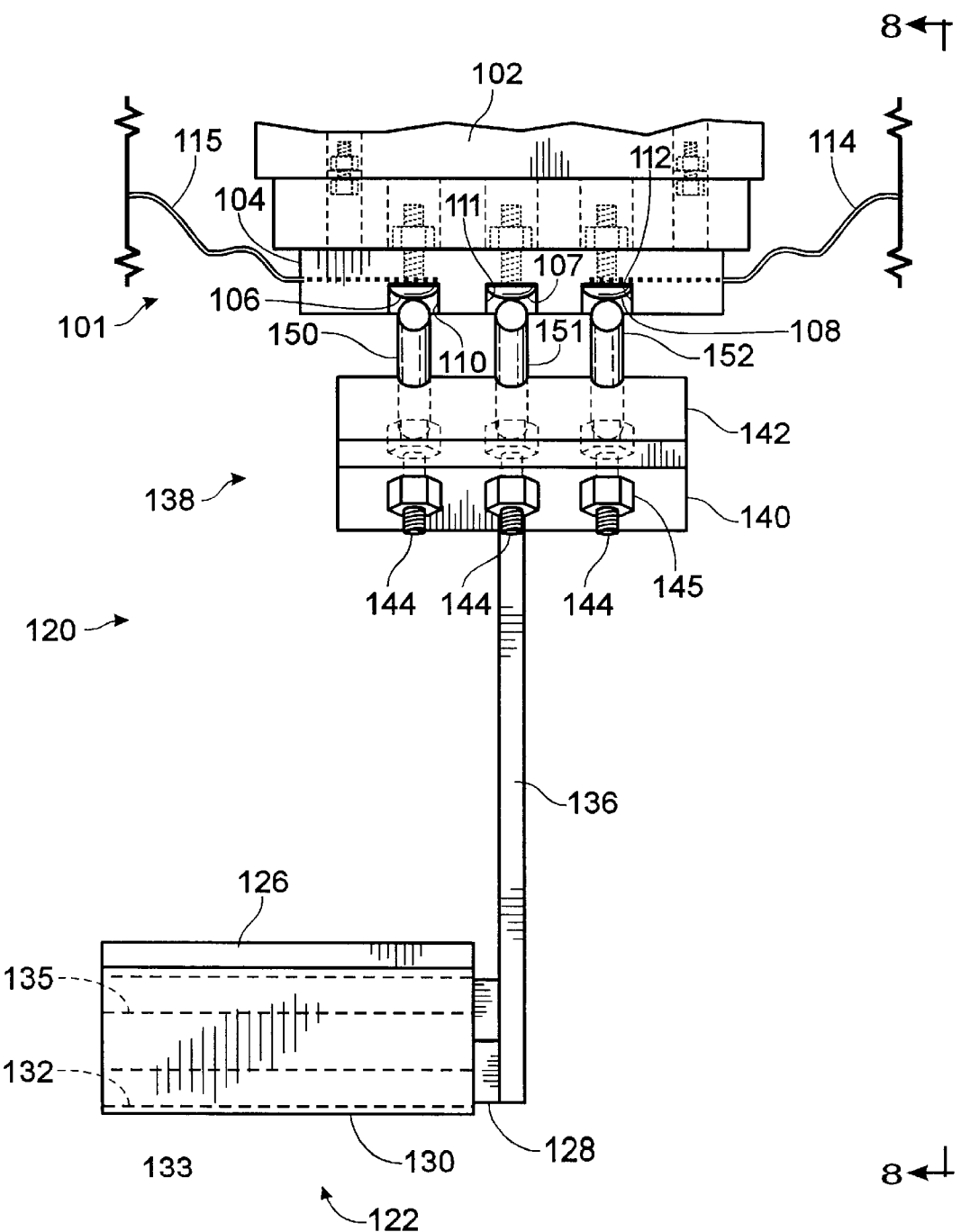
FIG. 7 is a front view of an electric contact assembly.
Figure 8:
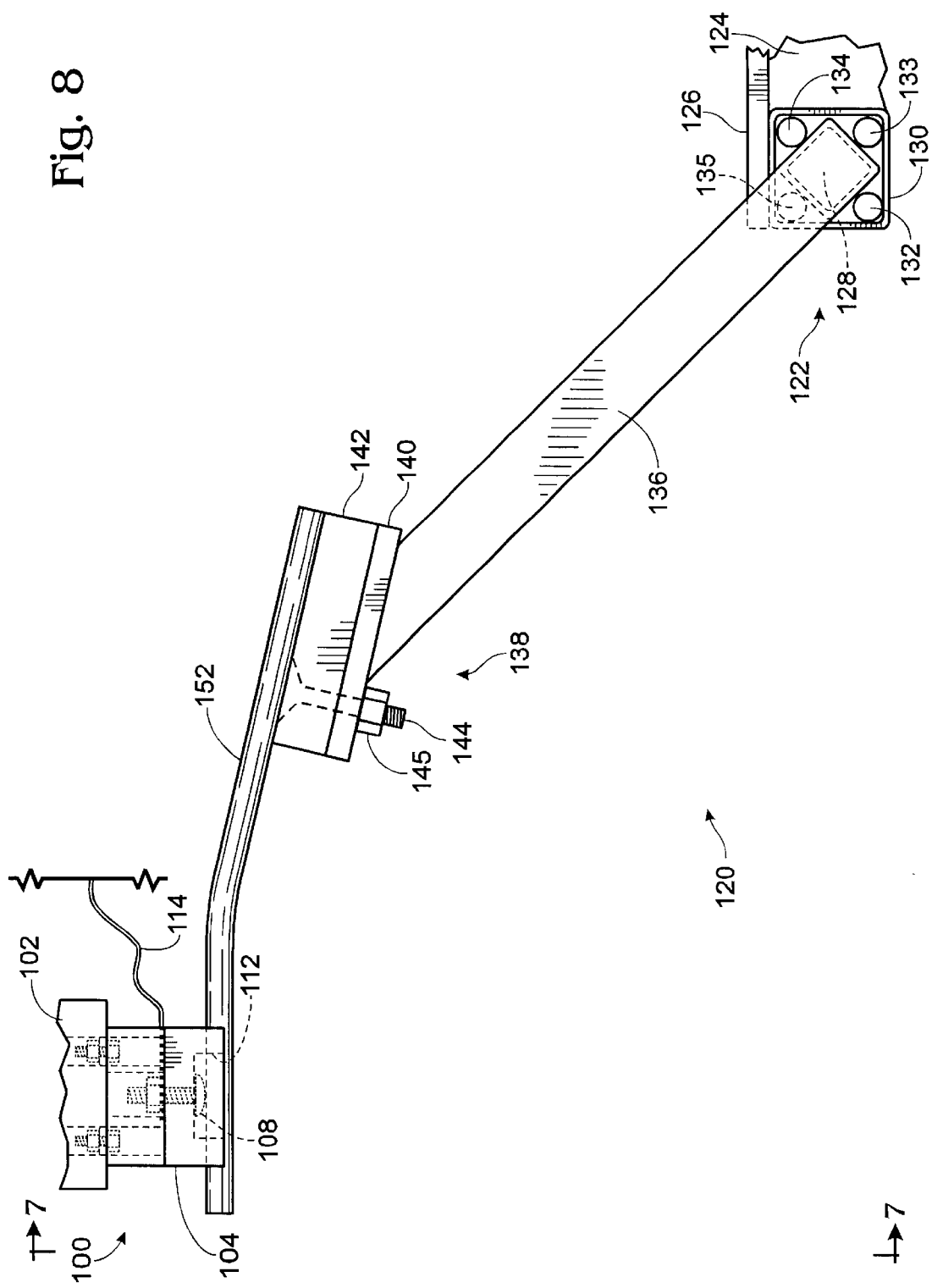
FIG. 8 is a side view of the electric contact assembly of FIG. 7 taken along line 8—8.

An electrical connection device that can be used in conjunction with the guidance system of this invention is illustrated in FIGS. 7 and 8. A female socket member 101 for mounting on the frame of a motor vehicle to be transported has a mounting bracket 102, an insulated body portion 104, and exposed conductive contacts 106, 107, and 108 which are located in slots 110, 111, and 112. Contacts 106, 107, and 108 may be, for example, the heads of brass carriage bolts. Contact 107 is grounded. Electrically conductive wiring 114 and 115 connects contacts 106 and 108 into an electrical circuit which would include a battery located either in the motor vehicle to be towed or on the trailer, an electrical device to be actuated (such as a motor) and a switch. Such a circuit can be easily fabricated by one skilled in the art and the specific circuit forms no part of the present invention.

A male plug assembly 120 is comprised of tension means 122 attached to tire stop 36 by mounting bracket 126. Tension means 122 is comprised of an inner torsion tube 128, an outer torsion tube 130, and four elastomeric tubes 132, 133, 134, and 135 positioned in the corners of outer torsion tube 130 and in yielding contact with the four outer sides of inner torsion tube 128, as illustrated.

One end of a torsion arm 136 is attached to inner torsion tube 128. The other end of torsion arm 136 is attached to an insulating socket base 138. Socket base 138 is comprised of a plate 140, attached to or integral with arm 136, having insulated mounting member 142 attached thereto by means of mounting bolt 144 and nut 145. Insulated mounting member 142 may be made of a plastic, such as ultra high molecular weight polyethylene.

Extending outwardly from insulated mounting member 142 of socket base 138 are three electrically conductive fingers or prongs 150, 151, and 152, preferably circular in cross-section. Mounting bolts 144 are conductive and may be attached to the bottom of prongs 150, 152 and 152 by soldering.

FIGS. 7 and 8 show prongs 150, 151, and 152 inserted into slots 110, 111, and 112 of female socket member 101 where they communicate with contact members 106, 107, and 108. Suitable wiring, not shown, can be attached to mounting bolts 144 to complete an electrical circuit which would include, for example, wires 114 and 115 extending from female socket member 101, a battery or other power source, a switch and motor.

Male plug assembly 120 can be either mounted on the deck or frame of a trailer 10 near the front end of a motor vehicle to be transported thereon (the preferred location) or mounted on the front underside of the motor vehicle to be transported. Similarly, female socket member 100 can be either mounted on the deck or frame of a trailer 10 near the front end of a motor vehicle to be transported thereon or mounted on the front underside of the motor vehicle to be transported (the preferred location) such as on frame member 101. The vehicle guidance system of the invention allows accurate positioning of the electrical contact assembly elements so that they can easily engage into electrical circuit completing contact when the motor vehicle is completely loaded onto the trailer.

The electrical connection device illustrated in FIGS. 7 and 8 and discussed above can also be used to connect the battery of an electric vehicle (via wires attached to mounting bolts 144) to a power source (via wires 114 and 115). The guidance system could be attached to the floor of a garage, for example, to guide the electric vehicle into charging connection with a power source. Commercially available electrical connectors may also be used instead of the connection device shown in FIGS. 7 and 8.

Figure 11:
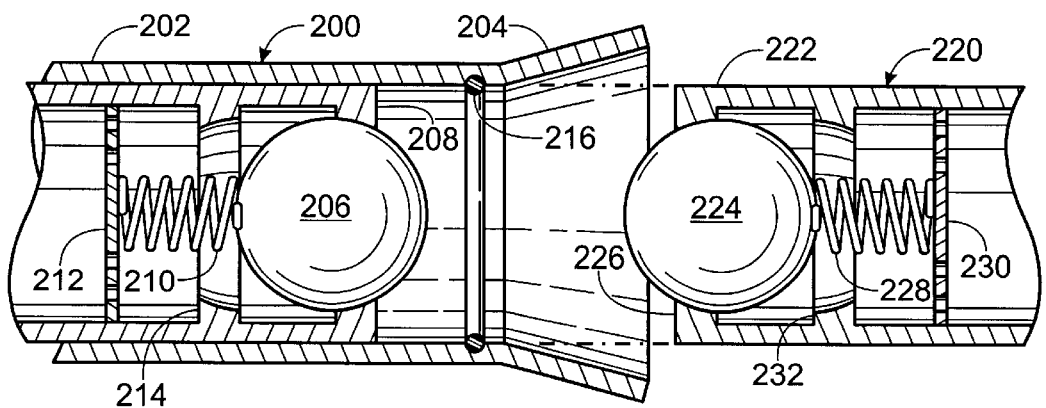
FIG. 11 is a cross-sectional view of a hydraulic connection mechanism for use in conjunction with the guidance system of the present invention.

Hydraulic or pneumatic coupling means that can be used with the guidance system of the present invention is shown in FIG. 11. However, there are many commercially available coupling means that could be employed.

The female element 200 of the coupling means is comprised of a tubular housing 202 having a flared outer end 204 adapted to receive the male element of the coupling means. Ball check valve 206 is urged into abutment with ball check seat 208 by spring means 210 whose base is fixed against stop member 212. Stop member 212 is adapted to allow the flow of fluid therethrough, such as by using a spider construction. Ball stop 214 prevents movement of ball check 206 beyond the location of the stop. A seal 216 is located in front of ball check valve 206.

The male element 220 of the coupling means is comprised of a tubular housing 222 having ball check valve 224 urged into abutment with ball check seat 226 by spring means 228 whose base is fixed against stop member 230. Stop member 230 is adapted to allow the flow of fluid therethrough, such as by using a spider construction. Ball stop 232 prevents movement of ball check 224 beyond the location of the stop.

In operation, male element 220 is inserted into female element 200. Male element 220 and female element can be held in place during use by means of a quick disconnect assembly, not shown. When male element 220 is fully inserted into female element 200, ball check valves 206 and 224 push against each other and against their respective spring members 210 and 228, thereby moving them away from their respective ball check seats 208 and 226 and opening communication between the interiors of female member 200 and male member 220.

Female element 200 may be attached to one of a motor vehicle (such as to frame member 101) or to a motor vehicle support surface with male element 220 being attached to the other of the motor vehicle or motor vehicle support surface, such as to tire stop 36 of trailer 10. The vehicle guidance system of the invention allows accurate positioning of female and male elements 200 and 220 so that they can easily connect to each other when the motor vehicle is fully positioned.

The invention has been described showing shims 270 and 272 used for adjusting the spacing between the primary guides and the adjacent tire surface. Instead of shims, the primary guides could be adjusted by use of a male or female threaded member extending between the secondary guide rails and the primary guides, hydraulic means, or other adjustment mechanisms known in the art.

While the invention has been described with reference to preferred embodiments thereof, variations thereto can be made without departing from the scope of the invention as claimed.

The invention claimed is:

1. A motor vehicle support surface and guidance system for fully positioning a motor vehicle having right and left front tires and right and left rear tires onto said motor vehicle support surface, said motor vehicle support surface including a first mating device extending from said motor vehicle support surface at a location adapted to engage a second mating device extending from a motor vehicle when said motor vehicle is fully positioned onto said vehicle support surface, said guidance system including right and left primary guide structures attached to said motor vehicle support surface adjacent the location of at least some of the right and left tires of said motor vehicle when it is fully positioned onto said vehicle support surface, each of said right and left primary guide structures having an outer planar surface located to tightly engage an outer surface of an adjacent tire of said motor vehicle and guide said motor vehicle to a mating device engagement position to cause said first and second mating devices to come into contact and operably engage when said motor vehicle is fully positioned into said guidance system.

2. The guidance system of claim 1 wherein said motor vehicle support surface is the deck of a motor vehicle carrier.

3. The guidance system of claim 2 including right and left secondary guide rails secured to said deck and extending longitudinally along the length of the deck in substantially parallel relationship, said right and left secondary guide rails being spaced apart a distance representing a boundary for lateral movement of the tires of a motor vehicle being loaded onto said deck of said motor vehicle carrier, said right and left primary guide structures extending from said right and left secondary guide rails, respectively, on the outboard side thereof and adjacent the location of at least some of the right and left tires of said motor vehicle.

4. The guidance system of claim 3 wherein said secondary guide rails are spaced apart a distance that is less than the distance between the inner surfaces of laterally adjacent tires of said motor vehicle.

5. The guidance system of claim 4 wherein said primary guide structures are located on the outboard side of said secondary guide rails.

6. The guidance system of claim 2 wherein said outer planar surfaces of said primary guide structures extend through the unloaded plane of the outer surface of the tire to be engaged.

7. The guidance system of claim 6 wherein said outer planar surface extends through the unloaded plane of the tire to be engaged by a distance greater than about 0.125 inch, but not so great as to prevent loading of said motor vehicle onto said carrier.

8. The guidance system of claim 6 wherein said outer planar surface extends through the unloaded plane of the tire to be engaged by a distance of about 0.125 inch.

9. The motor vehicle support surface and guidance system of claim 1 wherein said first mating device is a female member extending from said motor vehicle and said second mating device is a male member extending from said motor vehicle support surface.

10. The motor vehicle support surface and guidance system of claim 9 wherein said male and female members comprise a latching assembly forming a motor vehicle tie down means.

11. The motor vehicle support surface and guidance system of claim 1 wherein said first mating device is a male member extending from said motor vehicle and said second mating device is a female member extending from said motor vehicle support surface.

12. The motor vehicle support surface and guidance system of claim 11 wherein said male and female members comprise a latching assembly forming a motor vehicle tie down means.

13. The guidance system of claim 1 including a stop rail for engaging the front tires of the motor vehicle and preventing further forward movement.

14. The guidance system of claim 1 wherein said primary guide structures are sloped at an obtuse angle away from their outer planar faces at their rearward ends.

15. The system of claim 14 wherein primary guide structures located to engage the rear tires of said motor vehicle are also sloped at an obtuse angle away from their outer planar faces at their forward ends.

16. The guidance system of claim 1 wherein said mating devices are accessory control connections.

17. The guidance system of claim 16 wherein said accessory control connections are electrical connecting means.

18. The guidance system of claim 17 where said electrical connecting means comprises a male member adapted to operably connect to a female member, one of said male member and female members being attached to said support surface and the other being attached to said motor vehicle.

19. The guidance system of claim 18 wherein said female member has three slots therein with electrically conductive contacts located at the base of each of said slots, and said male member has three electrically conductive fingers adapted to fit into said slots and engage said contacts.

20. The guidance system of claim 19 wherein said female member is attached to said motor vehicle and said male member is attached to said support surface.

21. The guidance system of claim 16 wherein said accessory control connections are pneumatic or hydraulic connecting means.

22. The guidance system of claim 21 where said pneumatic or hydraulic connecting means comprises a male member adapted to operably connect to a female member, one of said male member and female members being attached to said support surface and the other being attached to said motor vehicle.

23. A motor vehicle support surface and guidance system for fully positioning a motor vehicle having right and left front tires and right and left rear tires onto said motor vehicle support surface, said motor vehicle support surface including a first mating device extending from said motor vehicle support surface at a location adapted to engage a second mating device extending from a motor vehicle when said motor vehicle is fully positioned onto said vehicle support surface, said guidance system including:

right and left secondary guide rails secured to said motor vehicle support surface and extending longitudinally along the length thereof in substantially parallel relationship, said right and left secondary guide rails being spaced apart a distance that is less than the distance between the inner surfaces of laterally adjacent tires of the motor vehicle being positioned onto said motor vehicle support surface; and right and left primary guide structures extending from said right and left secondary guide rails, respectively, on the outboard sides thereof and adjacent the location of at least some of the right and left tires of said motor vehicle when it is fully positioned onto said motor vehicle support surface, each of said right and left primary guide structures having an outer planar surface located to tightly engage the inner surface of an adjacent tire of said motor vehicle and guide said motor vehicle to an engagement position to cause said first and second mating devices to come into contact and operably engage when said motor vehicle is fully positioned into said guidance system.

* * * * *